US006673397B2

(12) United States Patent
Malik

(10) Patent No.: US 6,673,397 B2
(45) Date of Patent: Jan. 6, 2004

(54) METHOD OF PRODUCTION OF A CROSSLINKED PERFLUORINATED POLYETHER RELEASE FILM

(75) Inventor: Ranjit Malik, York, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 0 days.

(21) Appl. No.: 10/390,889

(22) Filed: Mar. 19, 2003

(65) Prior Publication Data
US 2003/0180467 A1 Sep. 25, 2003

Related U.S. Application Data

(62) Division of application No. 09/609,385, filed on Jul. 3, 2000, now Pat. No. 6,558,803.

(51) Int. Cl.$^7$ .................................................. C08J 7/04
(52) U.S. Cl. .................... 427/505; 427/385.5; 427/516; 427/521; 427/551; 427/557; 427/558; 427/559; 427/595; 427/596
(58) Field of Search ................................. 427/505, 516, 427/521, 551, 557, 558, 559, 595, 596, 385.5

(56) References Cited

U.S. PATENT DOCUMENTS

| 4,321,404 A | 3/1982 | Williams et al. |
| 4,472,480 A | 9/1984 | Olson |
| 4,567,073 A | 1/1986 | Larson et al. |
| 4,820,588 A | 4/1989 | Brinduse et al. |
| 4,830,910 A | 5/1989 | Larson |
| 5,306,758 A | 4/1994 | Pellerite |
| 5,948,478 A | 9/1999 | Lenti et al. |
| 5,959,058 A | 9/1999 | Tonelli et al. |
| 5,962,611 A | 10/1999 | Meijs et al. |
| 6,277,485 B1 | 8/2001 | Invie et al. |

FOREIGN PATENT DOCUMENTS

| EP | 0 089 820 A1 | 9/1983 |
| EP | 0 098 698 A2 | 1/1984 |
| EP | 0 098 699 A1 | 1/1984 |
| EP | 0 244 839 A2 | 11/1987 |
| EP | 0 249 048 A2 | 12/1987 |
| EP | 0 337 346 A1 | 10/1989 |
| EP | 0 433 070 A2 | 6/1991 |
| EP | 0 519 406 A2 | 12/1992 |
| EP | 0 622 353 A2 | 11/1994 |
| EP | 0 622 391 A2 | 11/1994 |
| EP | 0 812 890 A2 | 12/1997 |
| EP | 0 812 891 A2 | 12/1997 |

Primary Examiner—Bernard Pianalto
(74) Attorney, Agent, or Firm—Birch, Stewart, Kolasch & Birch, LLP

(57) ABSTRACT

A novel crosslinkable ambifunctional perfluorinated polyether is provided wherein the polyether is defined by the formula $X_1-(C_aF_{2a}O)_n-X_2$ where $X_1$ and $X_2$ are different functional terminal groups which are capable of forming a crosslinked perfluorinated polyether by addition, condensation or ring-opening reaction, and n ranges from 1 to 2000 and a is an integer of from 1 to 4. The mole ratio of $X_1$ and $X_2$ is 1:1. A release film may be formed from the crosslinked perfluorinated polyether.

11 Claims, No Drawings

METHOD OF PRODUCTION OF A CROSSLINKED PERFLUORINATED POLYETHER RELEASE FILM

This application is a divisional of application Ser. No. 09/609,385, filed on Jul. 3, 2000 U.S. Pat. No. 6,558,803, the entire contents of which are hereby incorporated by reference and for which priority is claimed under 35 U.S.C. § 120.

BACKGROUND OF THE PRESENT INVENTION

The present invention is directed to a crosslinkable perfluorinated polyether and method of preparation thereof, a release film and an adhesive tape formed thereof.

Release coatings are used to control or diminish the adhesion between an adhesive and a backing or substrate to which the adhesive is applied. Release coatings may be employed in conjunction with release films, release liners, non-stick carrier webs, and coatings for paper and polymer substrates. A release coating may also comprise a component of a multi-layer or laminated construction. For example, a typical multi-layer or laminated construction may comprise a pressure sensitive adhesive attached to a foamed or non foamed sheet or film, with one or more release layers being employed on one or more of the backing or adhesive layers. The release layer in such a construction may serve as a protective layer during handling or storage, especially when the adhesive layer is wound upon itself such as in the form of an adhesive tape.

Perfluorinated polyethers have been used as release coatings. See, for example, U.S. Pat. Nos. 4,321,404; 4,472,480; 4,567,073; 4,820,588; and 4,830,910; as well as European Patent application Nos. 89,820; 98,698; 98,699; 244,839; 249,048; 337,346; 519,406; 622,353; 622,391; 812,890; and 812,891. Perfluorinated polyethers can be either non-reactive oils (i.e., do not contain a reactive functionality), monofunctional or difunctional by nature, depending upon the number of terminal functional groups which are present on the polyether. However, the prior art focuses on use of identical functionalties in the preparation of such difunctional polyethers. The use of identical difunctionalities limits the ability of one skilled in the art to tailor the morphology of the network structure of the crosslinked perfluorinated polyether. Being able to control the morphology provides a means to tailor the release characteristics of the cured polyethers.

The practice of the prior art is dependent on the use of solvents to coat the perfluorinated polyethers. The use of solvents is a cause for safety, health and environmental pollution concerns. The ability to coat and cure perfluorinated polyethers of the present invention without the use of solvents is an advantage over the prior art.

The practice of the prior art is also dependent on the use of initiators, photoinitiators and catalysts (e.g., tin containing catalysts) that can leach out of the cured coating. The need of the sensitive electronics and medical markets for ultraclean materials imposes stringent demands on the amounts of leachable material in the coating.

OBJECTS AND SUMMARY OF THE PRESENT INVENTION

It is therefore an object of the present invention to provide a novel crosslinkable perfluorinated polyether for use in the production of a release film.

It is also an object of the present invention to provide a novel crosslinked perfluorinated polyether release coating for use in conjunction with adhesives.

It is also an object of the present invention to provide an adhesive tape which includes a novel crosslinked perfluorinated polyether release coating.

Furthermore, it is an object of the present invention to provide a novel perfluorinated polyether that can be coated without the use of solvents (also called a 100% solid formulation) and subsequently be crosslinked.

The stringent requirements of the electronics and healthcare markets demand that the release liner be ultraclean. It is accordingly also an object of the present invention to provide chemistries that support the use of non-migrating initiators and catalysts, especially tin free catalyst systems.

In accordance with the present invention, there is thus provided a crosslinkable perfluorinated polyether, the polyether defined by the formula $X_1—(C_aF_{2a}O)_n—X_2$ where $X_1$ and $X_2$ are different functional terminal groups which are capable of forming a polymer by either addition, condensation or ring-opening reaction, n ranges from 1 to 2000 and a is an integer from 1 to 4, and wherein the ratio of $X_1$ to $X_2$ is 1:1.

In accordance with the present invention, there is also provided a release film comprising:
 (1) a backing layer; and
 (2) a release liner comprising a crosslinked perfluorinated polyether, the polyether defined by the formula $X_1—(C_aF_{2a}O)_n—X_2$ where $X_1$ and $X_2$ are different functional terminal groups which are capable of forming a polymer by either addition, condensation or ring-opening reaction, n ranges from 1 to 2000 and a is an integer from 1 to 4, and wherein the ratio of $X_1$ to $X_2$ is 1:1.

In accordance with another embodiment of the present invention, there is provided an adhesive tape comprising:
 (1) at least one backing layer;
 (2) at least one adhesive layer; and
 (3) a release liner comprising a crosslinked perfluorinated polyether, the polyether defined by the formula $X_1—(C_aF_{2a}O)_n—X_2$ where $X_1$ and $X_2$ are different functional terminal groups which are capable of forming a polymer by either addition, condensation or ring-opening reaction, n ranges from 1 to 2000 and a is an integer from 1 to 4, and wherein the ratio of $X_1$ to $X_2$ is 1:1.

In accordance with the present invention there is further provided a method of production of a crosslinked perfluorinated polyether release film comprising the steps of:
 (a) providing a solvent-free coatable crosslinkable perfluorinated polyether, the polyether defined by the formula $X_1—(C_aF_{2a}O)_n—X_2$ where $X_1$ and $X_2$ are different functional terminal groups which are capable of forming a polymer by addition, condensation or ring-opening reaction, n ranges from 1 to 2000 and a is an integer of from 1 to 4, and wherein the ratio of $X_1$ and $X_2$ is 1:1;
 (b) coating said polyether on a substrate; and
 (c) subjecting said coated polyether to a thermal or radiation source effective to crosslink said polyether.

DETAILED DESCRIPTION OF THE INVENTION

The novel release coating of the present invention is comprised of a crosslinked perfluorinated polyether, the polyether defined by the formula $X_1—(C_aF_{2a}O)_n—X_2$ where $X_1$ and $X_2$ are different functional terminal groups which are capable of forming a polymer by addition, condensation or ring opening reaction, n ranges from 1 to 2000 and a is an integer of from 1 to 4, and wherein the ratio of $X_1$ and $X_2$ is 1:1.

The perfluorinated polyether repeating units $-(C_aF_{2a}O)_n-$ used in the perfluorinated polyether of the present invention are known in the release coating art as disclosed in U.S. Pat. Nos. 4,321,404; 4,472,480; 4,567,073; 4,820,588 and 4,830,910, each herein incorporated by reference. In the $-(C_aF_{2a}O)_n-$ repeating unit a represents an integer of from 1 to 4 and n ranges from 1 to 2000.

The polyether can be crosslinked by reaction of terminal functional groups $X_1$ and $X_2$ by condensation, addition or ring opening reactions. The functionalized perfluorinated polyether of the present invention is a self-crosslinkable polyether.

The requisite crosslinking reaction can occur by means of condensation (either thermal or photoinitiated), cationic (either thermal or photoinitiated) reaction and/or free radical (either thermal or photo initiated) reaction.

The choice of $X_1$ and $X_2$ permits the requisite crosslinking to occur with the proviso that $X_1$ and $X_2$ are different. The use of different terminal functional groups encourages "chain extension" polymerization reactions to occur as opposed to "network/ladder-type" polymerization reactions. The choice of terminal functional groups enables one skilled in the art to tailor the relative reactivity of the terminal groups and control the morphology of crosslinking. This enables the ultimate release characteristics of the crosslinked polyether to be tailored to a specific application.

U.S. Pat. No. 4,472,480 at column 4, line 15 provides that the perfluoropolyether disclosed therein have an average number of identical terminal functionalities within the range of 1.5 to 2.0 to provide effective covalent bonding. By contrast, the present invention requires the use of different terminal functionalities in a ratio of $X_1$ and $X_2$ to be 1:1 in order to provide a cohesive coating in a more effective manner.

Exemplary terminal functional groups $X_1$ and $X_2$ which may be employed include but are not limited to (meth) acrylate, epoxy, vinyl ether, propenyl ether, alkoxy silane, isocyanate, hydroxyl, amine, acid, etc. The chemical linking groups that are employed to attach the terminal groups $X_1$ and $X_2$ to the perfluorinated polyether are not critical to the practice of the claimed invention and can be readily determined by one skilled in the art. Examples of useful chemical bonds/linkages include but are not limited to ester, urea, amide, urethane, ether and sulfide. With respect to the specific terminal groups to be employed, the choice of complementary terminal groups may be determined by one skilled in the art. For instance, isocyanate terminal groups will crosslink with hydroxyl and amine groups. Acid terminal groups will crosslink with hydroxyl, epoxy and amine groups. Epoxy terminal groups will crosslink with hydroxyl groups. By way of example, a hydroxyl-terminated perfluorinated polyether will crosslink with an epoxy-terminated perfluorinated polyether.

Exemplary $X_1$ and $X_2$ terminal functional groups that may be employed in the present invention include:

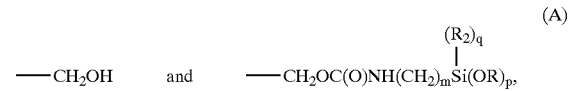

(A)

where m is an integer from 1 to 6, p is an integer from 1 to 3 and q is an integer from 0 to 2; where (OR) is a hydrolyzable moiety wherein R is selected from the group consisting of a hydrocarbon having from 1 to 5 carbon atoms and $-C(O)R_1$ wherein $R_1$ is a hydrocarbon having from 1 to 5 carbon atoms, and wherein $R_2$ is a $C_{1-6}$ hydrocarbon; and

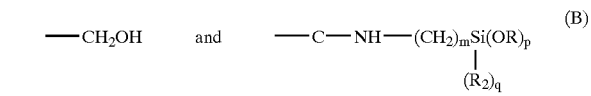

(B)

where m is an integer from 1 to 6, p is an integer from 1 to 3, and q is an integer from 0 to 2; where (OR) is a hydrolyzable moiety wherein R is selected from the group consisting of a hydrocarbon having from 1 to 5 carbon atoms and $-C(O)R_1$ wherein $R_1$ is a hydrocarbon having from 1 to 5 carbon atoms, and wherein $R_2$ is a $C_{1-6}$ hydrocarbon.

Exemplary R groups include alkyl groups. Exemplary $R_1$ groups include

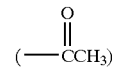

groups. Exemplary $R_2$ groups include $C_{1-6}$ straight or branched alkyl groups or alkene groups. One skilled in the art is able to select suitable R and R' groups for use in such terminal groups. See, for example, EP 433 070 which discloses hydrolyzable silane terminal groups.

Exemplary ambifunctional perfluorinated polyethers falling within the scope of the present invention are listed below, but the novel polyethers of the present invention are in no way limited to this listing:

(1)

HOCH$_2$—(C$_a$F$_{2a}$O)$_n$—CH$_2$OCH$_2$CH—CH$_2$
\O/

(2)

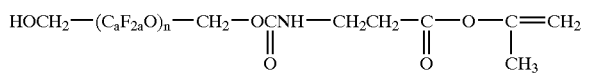

(3)

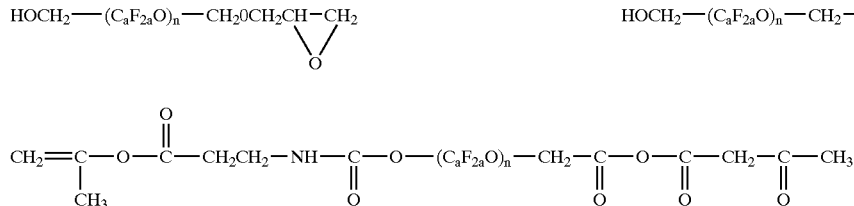

(4)

HO—CH$_2$—(C$_a$F$_{2a}$O)$_n$—CH$_2$OCH=CH—CH$_3$

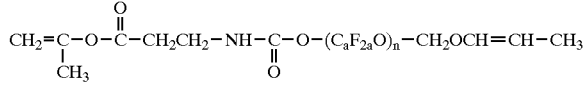

(6)

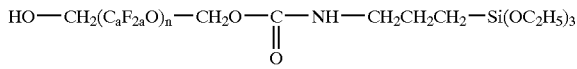

(7)

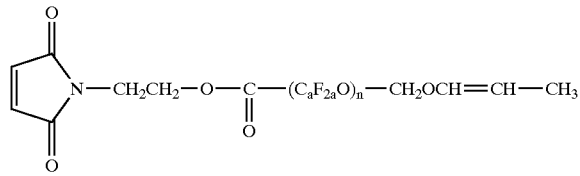

Epoxy, vinyl ether and propenyl ether terminal groups on perfluorinated polyethers can be crosslinked in the presence of cationic photoinitiators and radiation. One skilled in the art can readily determine suitable radiation/photoinitiator conditions. Acrylate and methacrylate terminated perfluorinated polyethers can be crosslinked in the presence of free radical initiators. Depending upon the initiator, either thermal or radiation curing may be used to initiate the reaction. Alkoxy silane terminal groups on perfluorinated polyethers can be crosslinked by thermal means in the presence of a suitable catalyst.

By way of example, the ambifunctional polymer (5) above has an acrylic terminal group at one end and a propenyl ether group at the other. These two terminal groups react by different mechanisms, namely, free radical and cationic, thereby enabling one to perform sequential reactions at the two ends. The ability to control the chemistry in this way enables one skilled in the art to control the morphology and in turn control the release properties of the coating.

Two terminal groups of the ambifunctional polymer (e.g., acetoacetate-ether or imide-ether pairs) can form a donor-acceptor charge transfer complex and therefore react with each other on exposure to UV radiation in the absence of a photoinitiator. This ambifunctional polymer is stable as long as it remains protected from UV radiation. Reference is made to ambifunctional polyethers (3) and (7) above in this regard. This strategy mitigates the undesirable contamination from photoinitiator fragments in the production of ultra clean release coatings. Additional examples of donor-acceptor pairs that form charge transfer complexes can be found in U.S. Pat. No. 5,446,073.

While the perfluorinated polyethers of the present invention are self-crosslinkable, an external crosslinking agent may also be employed whereby crosslinking can also occur between the perfluorinated polyether and the crosslinking agent each having functionally compatible terminal groups. Exemplary $X_1$ and $X_2$ terminal groups for use in connection with reaction with a crosslinking agent include epoxy, hydroxyl, amine, acid isocyanate, (meth)acrylate, ester groups, etc. Complementary functional terminal groups on the crosslinking agent include alcohol, acid, epoxy, isocyanate, (meth)acrylate, aziridine and amine functionalities. Exemplary crosslinking agents may be di- or multi-functional.

The identity of the crosslinking compound is not critical to practice of the claimed invention, as a variety of crosslinking compounds may be employed.

The crosslinking compound may be defined by the formulae

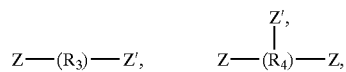

as the following crosslinking compounds:

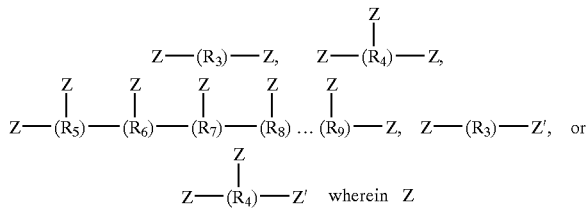

and Z' are a functional group such as an alcohol, acid, epoxy, isocyanate, (meth)acrylate, aziridine or amine capable of reacting with terminal groups $X_1$ and $X_2$ on the perfluorinated polyether, and $R_3$, $R_4$, $R_5$, $R_6$, $R_7$, $R_8$ and $R_9$ are spacer groups the identity of which is not critical. For instance, the spacer groups may be alkylene groups defined by the formula $(CR_{10}R_{11})_p$ where $R_{10}$, and $R_{11}$ may be independently hydrogen and $C_{1-3}$ alkyl and p is an integer from 1 to 10.

Crosslinking compounds useful in the present invention include organic compounds having an oxirane ring, a hydroxyl group, an acid group, an isocyanate group, or an amine group as functional groups polymerizably by ring opening or condensation.

Exemplary epoxy-containing crosslinking compounds include but are not limited to those which contain cyclohexene oxide groups such as the epoxycyclohexanecarboxylates, such as 3,4-epoxycyclohexylmethyl-3,4-epoxycyclohexanecarboxylate, 3,4-epoxy-2-methylcyclohexylmethyl-3,4-epoxy-2-methylcyclohexane carboxylate, bis(3,4-epoxycyclohexyl) adipate and bis(3,4-epoxy-6-methycyclohexylmethyl) adipate.

Epoxy-containing materials which are particularly useful in the practice of this invention include glycidyl ether monomers of the formula

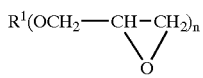

where R' is alkyl or aryl and n is an integer of 1 to 6. Examples are glycidyl ethers of polyhydric phenols obtained by reacting a polyhydric phenol with an excess of chlorochydrin such as epichlorohydrin (e.g., the digycidyl ether of 2,2-bis-(2,3-epoxypropoxyhenol)-propane). One skilled in the art can readily determine the identity of suitable epoxy compounds for use in the present invention. Reference is also made to the disclosure of U.S. Pat. Nos. 3,117,099 and 3,018,262, herein incorporated by reference.

Other crosslinking compounds comprise di or higher functional amines, and organic compounds having isocyantc (NCO) groups polymerizable by condensation reaction initiated by thermal means. Organic compounds belonging to the class of aziridines are also effective crosslinking agents which react by ring opening and initiated by thermal means. Di and multifunctional acrylates can effectively crosslink with complementary functional groups present on the perfluorinated polyether by way of Michael reaction.

Exemplary crosslinking compounds include but are not limited to the following:

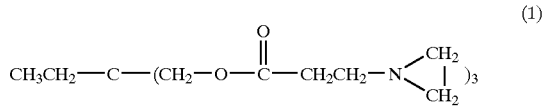

Trimethylolpropane-tris(beta-(N-Aziridinyl)propionate)

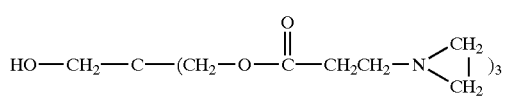

Pentaeryhthritol-tris-(Beta-(N-Aziridinyl)propionate)

(3) Desmodur BL 3175 A (Bayer) (a blocked aliphatic polyisocyanate based on hexamethylene diisocyanate (4) Desmodur BL 4265 (Bayer) (a blocked aliphatic polyisocyante based on isophorone diisocyanate (IPDI)

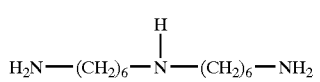

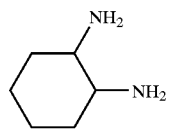

The molar ratio of crosslinking compound (if employed) to perfluorinated polyether in the release layer ranges from about 0.5:1 to about 150:1, and preferably from about 1:1 to about 4:1.

Various modifying substances may be formulated into the perfluorinated polyether composition. Such optional modifying substances include but are not limited to fillers, silicone release resins, fluorinated ethers and non-ionic surfactants of the formula HO—(CH$_2$CH$_2$O—)$_n$RH where R is (CH$_2$)$_m$ where n ranges from 1 to 20 and m ranges from 1 to 30. The addition of such compounds serves to alter the surface energy character of the release film in order to tailor its properties. Such compounds can be employed in an amount in the range of from 0.001 to 30% by weight. Fillers may also be added to reduce the cost of the expensive perfluorinated polyether composition. Exemplary fillers include a wide variety of mineral or polymeric fillers, such as polytetrafluoroethylene powder or talc.

The perfluorinated polyether composition of the present invention may also include up to 70% by weight of a crosslinkable difunctional perfluorinated polyether wherein both terminal functional groups are identical, and/or up to 70% by weight of a crosslinkable monofunctional perfluorinated polyether having only a single terminal reactive group. When such additional reactive components are present, a mixture of the polyethers is initially formed and subsequently caused to crosslink.

Formulations containing the perfluorinated polyether of the present invention may be prepared in the absence of a solvent. The 100% solid formulation is coated on a substrate using a roll coating or slot die technique. The coating is exposed to a thermal or UV/electron beam source for a period of time sufficient to result in crosslinking of the perfluorinated polyether itself (or with any crosslinking compound that may be present) whereby a release layer is formed. Exposure to the thermal or radiation source will generally range from about 1 second to 10 minutes, depending upon the type of the reactants and the initiator/catalyst employed, the thickness of the coating to be cured, etc. The release coating may be formed simply by forming a mixture of the crosslinkable perfluorinated polyether and optionally an external crosslinking compound in association with the initiator/catalyst, coating the mixture onto a backing material, and exposing the coating to a heat/radiation source for a time sufficient to form a cohesive release coating.

In the present invention the term "radiation" means light rays, such as ultraviolet rays, or ionizing radiation such as an electron beam. Thermally initiated reactions in the presence of a suitable catalyst can also be performed.

The invention is further described in the following examples, which are intended to be merely exemplary of the invention and not limiting in scope.

EXAMPLE

An ambifunctional perfluorocarbon was produced by the following method. 1 Kg. of α,ωdihydroxyperfluoropolyether (mw=2000) having the formula:

was placed in a container. 123.5 grams of 3-(triethoxysilyl) propylisocyanate of the formula:

was added to the container. 11.2 grams of TYZOR AA (DuPont) was added as a catalyst. The mixture was stirred for 30 minutes and then allowed to sit. The progress of the reaction was followed by FTIR. An ambifunctional perfluoropolyether was obtained after about 2 hours.

A typical coating formulation was made by dispersing 660 grams of SST4 (Shamrock Technologies) in 2950 grams of the ambifunctional perfluorinated as prepared above. The formulation was coated on a polyester substrate and cured at 320° F. for one minute to give a cohesive coating.

The release liner of the present invention can be employed in conjunction with an adhesive such as a pressure sensitive adhesive in the form of an adhesive tape. The identity of the adhesive which is employed is not critical to practice of the present invention and any adhesive can be employed in the tape of the present invention. By way of example, suitable adhesives include but are not limited to adhesives based on polyacrylates, polyvinyl ether, diene rubbers, butyl rubber, butadiene-acrylonitrile polymers, styrene-isoprene block copolymers, ethylene- propylene-diene polymers, styrene-butadiene polymers, poly-alpha-olefins, ethylene vinyl acetate, polyurethanes, polyamides, epoxy compounds, polyvinyl-pyrrolidone, polyesters, silicone polymers, etc. One skilled in the art can readily determine the identity of an acceptable adhesive.

A variety of backing materials can also be employed without restriction. For example, a variety of polymeric films may be employed as the backing film. Exemplary polymeric films include polyvinyl chloride, vinyl chloride-vinylidene chloride copolymer, vinyl chloride-vinyl acetate copolymer, vinyl chloride-acrylic acid copolymer, polyvinylidene chloride, polyolefins such as polyethylene or polypropylene, polymethyl methacrylate, polyvinyl alcohol, polyamide, polyimide, polyamideimide, polyesters such as polyethylene terephthalate, polycarbonate, polyurethance and cellulose acetate. A variety of non-polymeric films such as paper substrates may also be employed with advantage if desired.

Low surface energy materials such as the perfluorinated polyether of the present invention are difficult to adhere to a substrate. Therefore the perfluorinated polyether of the present invention may be coated on a primed substrate to promote adhesion of the perfluorinated polyether to the substrate. Titanium metal compounds/complexes and zirconium metal compounds/ complexes can be used as primer for promoting adhesion. Exemplary primers include a wide variety of compounds such as ethyl titanate, propyl titanate, isopropyl titanate, tertra butyl titanate, 2-ethylhexyl titanate, octylenglycol titanate, isostearoyl titanate, titanium acetylacetonate, triethanolamine titanate, zirconium lactate, zirconium, glycolate, propyl zirconate, tetra butyl zirconate, triethanolamine zirconate, zirconium propionate, and zirconium acetate.

In a typical procedure, a polyester film was coated with a solution of tetra butyl titanate to provide a thin layer (less than 2 $\mu$m) of dry primer coating. The substrate prepared in this way was then used as a substrate for the perfluorinated polyether formulation.

The adhesive tape of the present invention may take many forms. The release layer may be formed on one surface of a suitable backing material, with an adhesive layer being formed on the opposing surface of the backing material. The release layer may be formed on both sides of the backing material, with a layer of adhesive being formed on the exposed surface of one of the release layers. Alternatively, the release layer may be applied to a layer of adhesive which is formed on the backing material. Still further, the adhesive layer may be applied to a release layer which is itself applied to the backing layer. Other embodiments may be apparent to those skilled in the art and which fall within the scope of the invention.

The adhesive tape of the present invention may be formed by conventional means. To form the release liner, a reaction mixture of the perfluorinated polyether having the requisite functional terminal groups $X_1$ and $X_2$ and optionally crosslinking compound together with initiator is coated on a suitable backing layer and caused to react in the presence of a suitable thermal and/or radiation source. Alternatively, the release liner may be formed by coating a mixture of suitably functionalized self-crosslinkable perfluorinated polyether and a suitable initiator on a backing layer and caused to react in the presence of a suitable thermal and/or radiation source. An adhesive tape may be formed by lamination of the thus-formed release liner to a preformed laminate of adhesive on a backing material, whereby the release coating is applied to the adhesive layer. Alternatively, an adhesive layer may be coated onto one or more surfaces of the release liner, with a second release liner optionally subsequently being applied to the adhesive layer to form a tape comprised of an adhesive layer sandwiched between two backing layers and two release layers. Still further, an adhesive layer may be coated onto one surface of a release coating of a laminate comprised of a backing layer sandwiched between two release layers. Additional embodiments may be apparent to those skilled in the art yet still fall within the scope of the present invention.

What is claimed is:

1. A method of production of a crosslinked perfluorinated polyether release film comprising the steps of:
   (a) providing a solvent-free coatable crosslinkable perfluorinated polyether, the polyether defined by the formula $X_1$—$(C_aF_{2a}O)_n$—$X_2$, where $X_1$ and $X_2$ are different functional terminal groups which are capable of forming a polymer by addition, condensation or ring-opening reaction, n ranges from 1 to 2000 and a is an integer of from 1 to 4, and wherein the ratio of $X_1$ and $X_2$ is 1:1;
   (b) coating said polyether on a substrate; and
   (c) subjecting said coated polyether to a thermal or radiation source effective to crosslink said polyether.

2. The method of claim 1 wherein n ranges from 1 to 200.

3. The method of claim 1 further comprising incorporating a filler with said polyether.

4. The method of claim 1 where $X_1$ or $X_2$ is an epoxy group.

5. The method of claim 1 wherein $X_1$ and $X_2$ are selected from the group consisting of epoxy, hydroxyl, amine, hydrogen, acid, imides, acetoacetate, alkoxy silane, (meth) acrylate, ester, vinyl ether, propenylether, and isocyanate groups.

6. The method of claim 1 wherein $X_1$ and $X_2$ are

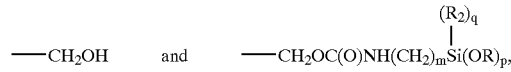

respectively, where m is an integer from 1 to 6, p is an integer from 1 to 3 and q is an integer from 0 to 2, where (OR) is a hydrolyzable moiety wherein R is selected from the group consisting of a hydrocarbon having from 1 to 5 carbon atoms and —C(O)$R_1$ wherein $R_1$ is a hydrocarbon having from 1 to 5 carbon atoms, and wherein $R_2$ is a $C_{1-6}$ hydrocarbon.

7. The method of claim 1 wherein $X_1$ and $X_2$ are

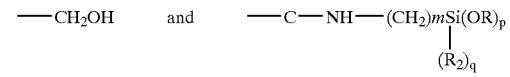

where m is an integer from 1 to 6, p is an integer from 1 to 3, and q is an integer from 0 to 2, where (OR) is a hydrolyzable moiety wherein R is selected from the group consisting of a hydrocarbon having from 1 to 5 carbon atoms and —C(O)RI wherein $R_1$ is a hydrocarbon having from 1 to 5 carbon atoms, and wherein $R_2$ is a $C_{1-6}$ hydrocarbon.

8. The method of claim 1 wherein said polyether is subjected to electron beam radiation.

9. The method of claim 1 wherein said release layer further comprises up to 70% by weight of a crosslinkable difunctional perfluorinated polyether having identical terminal functional groups and up to 70% by weight of a crosslinkable perfluorinated polyether having a single functional terminal group, based on the weight of the release layer.

10. The method of claim 1 wherein said substrate is coated with a solution comprising an adhesion promoter selected from the group consisting of ethyl titanate, propyl titanate, isopropyl titanate, tertra butyl titanate, 2-ethylhexyl titanate, octylenglycol titanate, isostearoyl titanate, titanium acetylacetonate, triethanolamine titanate, zirconium lactate, zirconium, glycolate, propyl zirconate, tetra butyl zirconate, triethanolamine zirconate, zirconium propionate, zirconium acetate and mixtures thereof prior to said polyether being coated on said substrate.

11. The method of claim 1 further comprising incorporating a crosslinking agent with said polyether prior to step (c).

* * * * *